March 17, 1925. 1,530,132
J. F. McMAHON
SUBSOIL STALK CUTTER
Filed Sept. 24, 1923
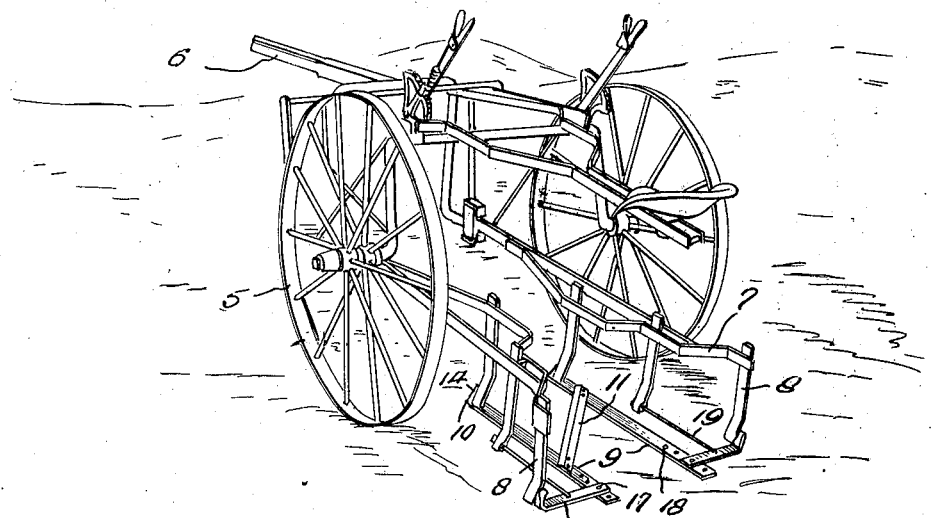
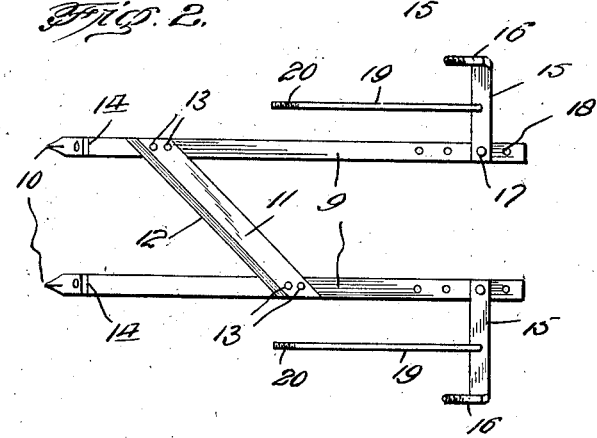
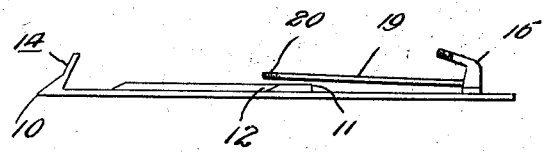
Inventor
John F. McMahon.
Witness.
F. C. Gibson.
By Clarence A. O'Brien
Attorney Patented Mar. 17, 1925.

1,530,132

UNITED STATES PATENT OFFICE.

JOHN F. McMAHON, OF EDINBURG, TEXAS.

SUBSOIL STALK CUTTER.

Application filed September 24, 1923. Serial No. 664,384.

*To all whom it may concern:*

Be it known that I, JOHN F. MCMAHON, a citizen of the United States, residing at Edinburg, in the county of Hidalgo and State of Texas, have invented certain new and useful Improvements in Subsoil Stalk Cutters, of which the following is a specification.

This invention relates to sub-soil stalk cutters, and has particular reference to a cutter adapted to be drawn beneath the surface of the soil for cutting the stalks of standing cotton plants or the like.

The primary object of the invention is to provide a stalk cutter of the above kind which embraces the desired qualities of simplicity and durability of construction as well as efficiency in operation, whereby the same may meet with all of the requirements for a successful commercial use.

Another object of the invention is to provide a sub-soil stalk cutter of the above kind embodying a cutting element and means for effectively attaching the same to the shovel supporting standards of a straddle row cultivator, wherein the standards are carried in staggered relation by means of a pair of spaced drag bars.

Other object will appear as the nature of the invention is better understood, and the same consists in the novel form, combination, and arrangement of parts hereinafter more fully described, shown in the accompanying drawings, and claimed:

In the drawings, wherein like reference characters indicate corresponding parts throughout the several views:

Figure 1 is a perspective view, showing a sub-soil stalk cutting element operatively attached to the shovel supporting standards of a straddle row cultivator, said cutter element being constructed in accordance with the present invention.

Figure 2 is a top plan view of the cutting elements detached, and

Figure 3 is a side elevational view of the device shown in Figure 2.

Referring more in detail to the drawing, the invention. is shown in Figure 1 as applied to a conventional form of wheeled straddle row cultivator embodying a frame of suitable form mounted upon supporting wheels 5 and provided with a draft tongue 6, said frame being also provided with attached rearwardly extending spaced rag bars 7 that are respectively located at opposite sides of the longitudinal center of the cultivator and that carry a pair of series of staggered depending standards 8 adapted to move alongside of the row of standing plants and having suitable openings in the lower ends thereof by means of which ordinary forms of cultivator shovels may be bolted to the lower ends of said standards.

The present invention is herein shown as an attachment for cultivators of the above general form of construction, adapted for attachment to the lower end of said shovel supporting standards 8 and this cutting element embodies a pair of longitudinal spaced parallel sub-soil runners 9 formed of suitable strips or bars of rigid metal and suitably pointed at their forward ends as at 10 for penetrating the ground, said runners being rigidly connected by means of an obliquely disposed cutting blade 11 that is provided with a front cutting edge 12 and whose ends are rigidly secured to the runners 9 as at 13 by bolting or the like. The runners 9 are spaced apart a distance substantially similar to the spacing of the front pair of shovel supporting standards 8, and the forward ends of said runners are provided with upstanding lugs or ears 14 by means of which the forward ends of the runners may be bolted to the forward pairs of standards 8 when the shovels have been removed from the standards.

Extending outwardly and laterally from the rear portions of the runners 9 are a pair of transversely aligned bars 15 having means, as generally indicated at 16 upon their outer ends for facilitating the attachment thereof to the lower ends of the rearmost pair of shovel supporting standards 8. As shown clearly in Figures 2 and 3, the means at 16 embody integral threaded stems directed upwardly and forwardly of the outer ends of the bars 15 and adapted to pass through the openings in the lower ends of the rear standards 8, the stems being secured in the standards by means of suitable nuts threaded upon the forward projecting ends of the stems, similar to the manner usually practiced when attaching the cultivator shovel (not shown).

The laterally extending bars 15 are adjustable to points at varying distances from the rear ends of the runners 9 to accommodate the device to various forms or sizes of cultivators, and this is accomplished preferably by bolting the bars 15 to the runners 9 as indicated at 17, the runners being provided at their rear end portions with a plurality of series of longitudinal openings or perforations as at 18 for reception of the bolts 17.

The bars 15 are provided intermediate their ends with rigid forwardly projecting rods 19, the forward free end portions of which are threaded as indicated at 20. The forward ends of these rods are positioned to pass through the bolt openings in the lower ends of the intermediate pair of standards 8, so that when nuts are threaded upon the threaded ends 20 at opposite sides of said intermediate pair of standards, the remaining or intermediate pair of standards are utilized for the support of the device and its rigid attachment to the drag bar.

In operation, the drag bars are lowered in a well known manner so that the runners 9 and cutting blade 11 penetrate the soil and move horizontally a slight distance beneath the surface thereof. The runners, upon forward travelling movement of the device will pass along opposite sides of the stalks of the standing row of cotton plants, so that the latter are engaged and cut respectively as they are encountered by the knife or blade 11, thus leaving no standing stubs as is experienced by cutters adapted to operate above or upon the surface of the soil.

From the above description, it is believed that the construction and operation, as well as the advantages of the invention will be readily understood and appreciated by those skilled in the art.

Minor changes may be made without departing from the spirit or scope of the invention as claimed.

What I claim as new is:

1. A sub-soil standing stalk cutter of the character described comprising a pair of spaced parallel horizontal runners adapted to penetrate and run beneath the surface of the soil, an oblique stalk cutting blade rigidly connecting and extending between said runners, and means to rigidly attach the runners to the lower ends of the shovel supporting standards carried by the drag bar of a straddle row cultivator, said last named means embodying ears upon the forward ends of the runner, for facilitating bolting of the forward ends of the runner to the forward pair of shovel supporting standards of said cultivator, laterally and outwardly projecting bars rigidly carried by the rear end portions of the runners and provided with means upon their outer ends for facilitating connection of the same with the rear pair of shovel supporting standards of said cultivator, and forwardly projecting rods rigid with the intermediate portion of said laterally extending bar provided with means upon their forward rear ends for facilitating attachment thereof to the lower ends of the intermediate pair of shovel supporting standards of the cultivator.

2. A sub-soil standing stalk cutter of the character described comprising a pair of spaced parallel horizontal runners adapted to penetrate and run beneath the surface of the soil, an oblique stalk cutting blade rigidly connecting and extending between said runners, and means to rigidly attach the runners to the lower ends of the shovel supporting standards carried by the drag bar of a straddle row cultivator, said last named means embodying ears upon the forward ends of the runner, for facilitating bolting of the forward ends of the runner to the forward pair of shovel supporting standards of said cultivator, laterally and outwardly projecting bars rigidly carried by the rear end portions of the runners and provided with means upon their outer ends for facilitating connection of the same with the rear pair of shovel supporting standards of said cultivator, and forwardly projecting rods rigid with the intermediate portion of said laterally extending bar provided with means upon their forward ends for facilitating attachment thereof to the lower ends of the intermediate pairs of shovel supporting standards of the cultivator, and means for rigidly attaching the inner ends of the laterally extending bar to the rear end portions of the runners at varying distances from the rear ends of said runners at will.

In testimony whereof I affix my signature.

JOHN F. McMAHON.